(12) United States Patent
Teraoka et al.

(10) Patent No.: US 6,793,603 B2
(45) Date of Patent: Sep. 21, 2004

(54) POWER TRANSMISSION SYSTEM WITH SUB TRANSMISSION MECHANISM

(75) Inventors: Masao Teraoka, Tochigi (JP); Masayuki Nagai, Fuji (JP)

(73) Assignees: Tochigi Fuji Sangyo Kabushiki Kaisha (JP); JATCO Ltd. (JP)

( * ) Notice: Subject to any disclaimer, the term of this patent is extended or adjusted under 35 U.S.C. 154(b) by 0 days.

(21) Appl. No.: 10/278,389

(22) Filed: Oct. 23, 2002

(65) Prior Publication Data

US 2003/0109349 A1 Jun. 12, 2003

(30) Foreign Application Priority Data

Oct. 25, 2001 (JP) .......................................... 2001-327834

(51) Int. Cl.[7] .......................... F16H 37/02; B60K 17/06
(52) U.S. Cl. ........................................ 475/216; 475/204
(58) Field of Search ................................ 475/204, 206, 475/214, 215, 216; 180/247, 248, 249

(56) References Cited

U.S. PATENT DOCUMENTS

| 4,614,126 A | * | 9/1986 | Edelen et al. ................. 74/333 |
| 5,738,604 A | * | 4/1998 | Dick .......................... 475/206 |
| 2003/0106734 A1 | * | 6/2003 | Nagai et al. ................ 180/233 |

FOREIGN PATENT DOCUMENTS

| EP | 293248 A2 | * | 11/1988 | ............ F16H/3/08 |
| JP | 58170949 A | * | 10/1983 | ............ F16H/3/10 |
| WO | WO 3033939 A2 | * | 4/2003 | |

* cited by examiner

Primary Examiner—Richard M. Lorence
(74) Attorney, Agent, or Firm—Morrison & Foerster LLP

(57) ABSTRACT

A power transmission system which includes a transmission device and a power transfer system. The transmission device includes an input shaft to which a drive force from a motor is inputted, a transmission mechanism arranged coaxially with the input shaft, and a countershaft parallel to the input shaft. The power transfer system distributes the drive force transmitted to the countershaft to front and rear wheels, and includes a sub transmission mechanism coaxially arranged in an end of the countershaft.

13 Claims, 11 Drawing Sheets

US 6,793,603 B2

POWER TRANSMISSION SYSTEM WITH SUB TRANSMISSION MECHANISM

BACKGROUND OF THE INVENTION

1. Field of Invention

The present invention relates to a power transmission system, particularly to a power transmission system for a four-wheel drive vehicle, which includes a countershaft type transmission device as a principal transmission mechanism, a sub transmission mechanism, and a power transfer system.

2. Description of Related Art

Where a continuously variable transmission as disclosed in Japanese Patent Application Laid-open No. 8 (1996)-21503 is used for a power transmission system of a four-wheel drive vehicle, there has been a demand that a sub transmission mechanism is employed to widen a transmission range of the power transmission system, in order to achieve both off-road and on-road abilities and improve fuel economy and silence.

Since a power transfer system is generally combined with the continuously variable transmission, the power transmission system becomes heavy and long in its axial direction. This causes changes, for example, in a propeller shaft and a casing (transmission case and power transfer system case), resulting in cost increase.

SUMMARY OF THE INVENTION

The object of the present invention is to provide a lightweight and compact power transmission system at low costs, with a sub transmission mechanism assembled to a basic structure of a countershaft type transmission device and a power transfer system.

An aspect of the present invention is a power transmission system comprising: a transmission device including an input shaft to which a drive force from a motor is inputted, a transmission mechanism arranged coaxially with the input shaft, and a countershaft parallel to the input shaft; and a power transfer system for distributing the drive force transmitted to the countershaft to front and rear wheels, wherein the power transfer system includes a sub transmission mechanism coaxially arranged in an end of the countershaft.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
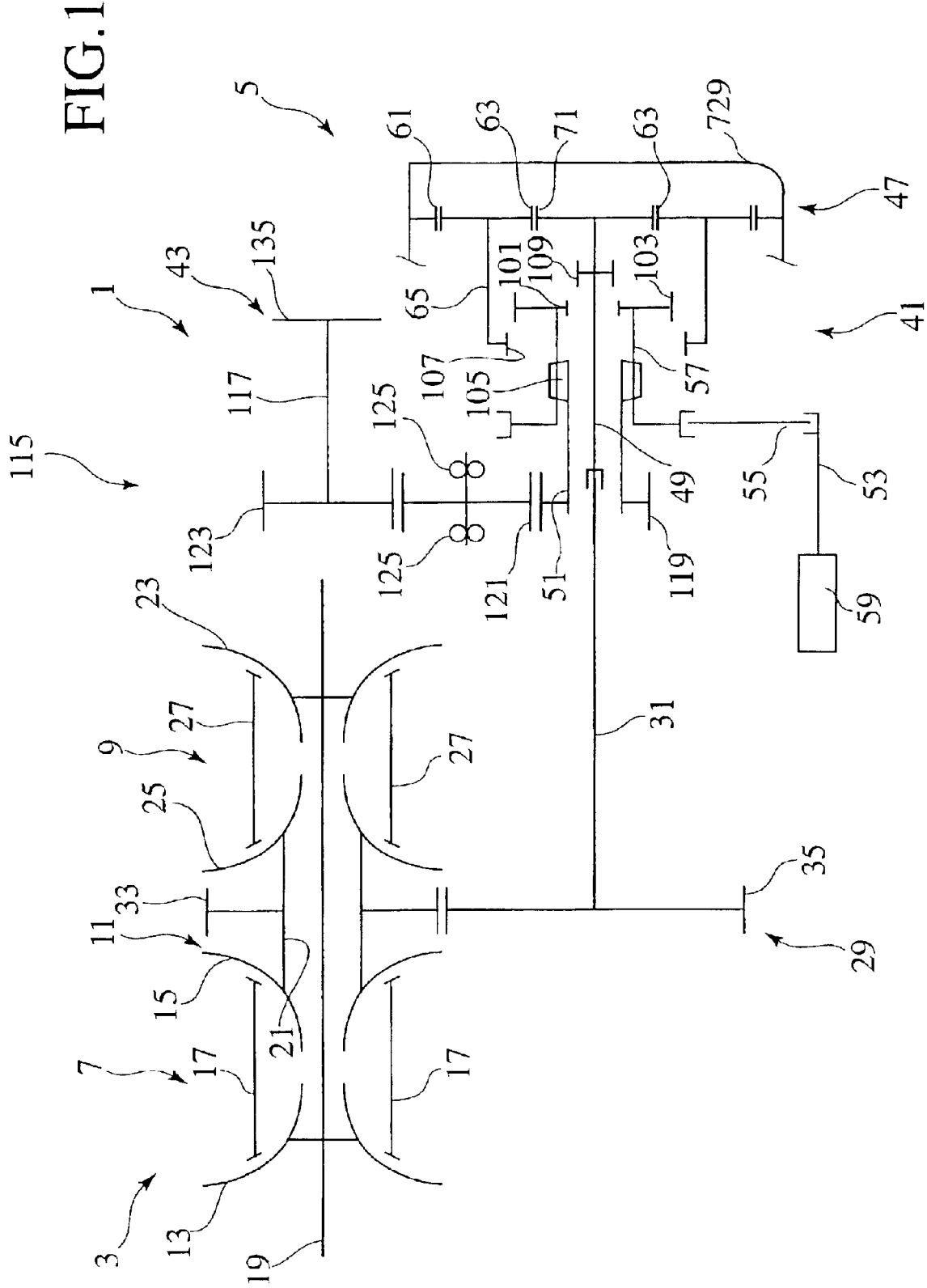
FIG. 1 is a diagram showing a power transmission system according to a first embodiment of the present invention.

Embodiments of the present invention will be explained below with reference to the drawings, wherein like members are designated by like reference characters. Members without reference numerals in the following description are not illustrated. Left in FIGS. 1 to 4 and FIGS. 6 to 10, and upper in FIG. 11 correspond to front of a vehicle.

First Embodiment

Description will be made for a power transmission system 1 (a first embodiment of the present invention) with reference to FIGS. 1 to 5 and FIG. 11.

Figure 11:
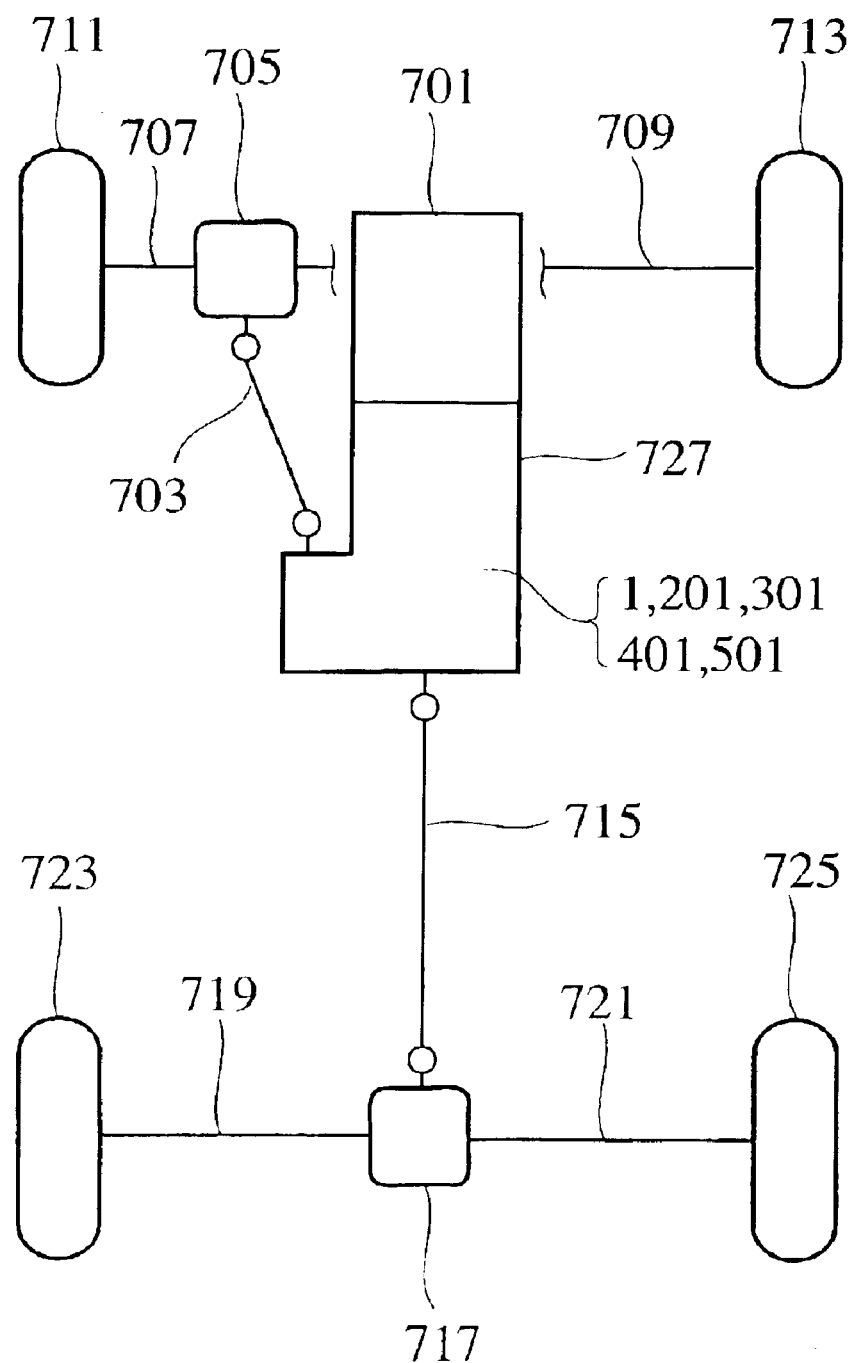
FIG. 11 is a diagram showing a power train for a four-wheel drive vehicle using the individual embodiments of the present invention.

As shown in FIG. 11, a power train of a vehicle includes a longitudinally mounted motor 701, the power transmission system 1 accommodated in a casing 727, a front wheel propeller shaft 703, a front differential (a differential device for distributing drive force from the motor to left and right front wheels) 705, front axles 707 and 709, right and left front wheels 711 and 713, a rear wheel propeller shaft 715, a rear differential (a differential device for distributing drive force from the motor to right and left rear wheels) 717, rear axles 719 and 721, and right and left rear wheels 723 and 725.

The drive force from the motor 701 is distributed to the front and rear wheels by the power transmission system 1. The drive force distributed to the front wheel is transmitted through the propeller shaft 703 to the front differential 705, and distributed from the front differential 705 to the right and left front wheels 711 and 713 via the front axles 707 and 709, respectively. The drive force distributed to the rear wheel is transmitted through the propeller shaft 715 to the rear differential 717, and distributed from the rear differential 717 to the right and left rear wheels 723 and 725 via the rear axles 719 and 721, respectively.

As shown in FIG. 1, the power transmission system 1 includes a double cavity type toroidal continuously variable transmission 3 (a countershaft type transmission device as a principal transmission mechanism), and a power transfer system (transfer device) 5.

The toroidal continuously variable transmission 3 includes a torque converter, a forward/reverse changeover mechanism, continuously variable transmission units (transmission mechanisms) 7 and 9, and an output unit 11, which are arranged coaxially with each other.

The drive force from the motor 701 is transmitted to the forward/reverse changeover mechanism through the torque converter.

The forward/reverse changeover mechanism includes, for example, a planetary gear mechanism and a pair of multiple-disc clutches. The transmitted drive force is inputted to an internal gear of the planetary gear mechanism. When the internal gear and a pinion carrier are locked by means of the multiple-disc clutch, rotation of the internal gear is outputted from a sun gear in a same rotation direction. When the lock of the internal gear and the pinion carrier are released, and the pinion carrier is locked on a stationary part by means of the other multiple-disc clutch, rotation of the internal gear is reversed and outputted from the sun gear.

The forward/reverse changeover mechanism transmits the drive force to the continuously variable transmission units 7 and 9 by changing the rotational direction in such a manner in accordance with the forward/reverse movement of the vehicle.

The continuously variable transmission unit 7 includes a pair of an input disc 13 and an output disc 15, a friction roller 17, an input shaft 19, and an output shaft 21. The continuously variable transmission unit 9 includes a pair of an input disc 23 and an output disc 25, a friction roller 27, an input shaft 19, and an output shaft 21. The input and output shafts 19 and 21 are commonly used with the continuously variable transmission unit 7.

The input shaft 19 is coupled to an output shaft of the forward/reverse changeover mechanism, and the output shaft 21 is arranged on the outer circumference of the input shaft 19 so as to be relatively rotatable.

The input disc 13 and the output disc 15, and the input disc 23 and the output disc 25 are arranged to face each other such that profiles of the friction surfaces thereof form a circle, in other words, such that the friction surfaces of the opposed discs cooperate to draw substantially a semicircle in a plane section containing a rotational axis of the shafts 19 and 21. The output discs 15 and 25 are fixed to the output shaft 21 such that the rear surfaces of the friction surfaces thereof are faced each other. The input discs 13 and 23 are fixed to the input shaft 19 outside the output discs 15 and 25 in the axial direction thereof.

The friction rollers 17 and 27 are pressed against the friction surfaces of the input disc 13 and the output disc 15 and the friction surfaces of the input disc 23 and the output disc 25, respectively. The drive force transmitted from the forward/reverse changeover mechanism to the input shaft 19 is transmitted from the input disc 13 and 23 via the friction rollers 17 and 27 to the output discs 15 and 25 by friction between the discs and the rollers to rotate the output shaft 21.

In this case, when the rotational axes of the friction rollers 17 and 27 are slightly moved from the rotational axes of the discs, forces of pressing outward the contact points of the friction rollers 17 and 27 are generated by turning force of the discs. Since the discs rotate at a high speed, large pressing forces are obtained, so that the tilt angles of the friction rollers 17 and 27 are varied with extremely quick response.

In accordance with change in the tilt angles of the friction rollers 17 and 27, the diameters of the contact circles between the friction rollers and the discs change, and thus the rotational speed of the output shaft 21 increases or decreases. For example, if the friction rollers 17 and 27 are tilted in a direction such that the contact circles between the friction rollers and the input discs 13 and 23 increase in diameter and the contact circles between the friction rollers and the output discs 15 and 25 decrease in diameter, the rotational speed of the output shaft 21 increases. If each of the friction rollers 17 and 27 is tilted in an opposite direction, the rotational speed thereof is decreased.

Since the input discs 13 and 23 are fixed on the input shaft 19 to face each other and the output discs 15 and 25 are fixed on the output shaft 21 to face each other as described above, thrust forces caused in the discs pressed by the friction rollers 17 and 27 are canceled each other within the input shaft 19 and the output shaft 21, and are not transmitted outward.

As shown in FIG. 1, the output unit 11 includes a gear set 29, and a countershaft 31 arranged in parallel to the input shaft 19 and the output shaft 21.

The gear set 29 includes a drive gear 33 fixed to the output shaft 21 and a driven gear 35 fixed to the countershaft 31.

The gear set 29 connects the output shaft 21 and the countershaft 31. The drive force taken out from the continuously variable transmission units 7 and 9 to the output shaft 21 is reversed by the gear set 29 and transmitted to the countershaft 31.

As shown in FIGS. 1 to 4, the power transfer system 5 includes a high-low changeover mechanism 41 (sub transmission mechanism), a rear wheel drive force output system 43, and a front wheel drive force output system 45.

The high-low changeover mechanism 41 is arranged in the rear end portion of the countershaft 31. The high-low change mechanism 41 includes a single pinion planetary gear set 47, a hollow input shaft 49, a hollow output shaft 51, and an operation system having a shift rod 53, a shift fork 55, a high-low sleeve 57, and an actuator 59 (electromotive stepping motor or the like).

The planetary gear set 47, as described below, is attached to a housing 743 provided in a transfer cover (cover member) 729. A housing 731 accommodating the rear wheel drive force output system 43 is formed in part of the transfer cover 729. The transfer cover 729 is attached to a transfer case 737 with a bolt 735 by sandwiching a spacer 733 therebetween.

The spacer 733 and the transfer case 737 constitute part of the casing 727 in FIG. 11. The casing 727 is sectioned by a seal 170 provided on the countershaft and a seal 739 in FIG. 2 into a transmission case portion for accommodating the toroidal continuously variable transmission 3 and a transfer case portion for accommodating the power transfer system 5.

Figure 2:
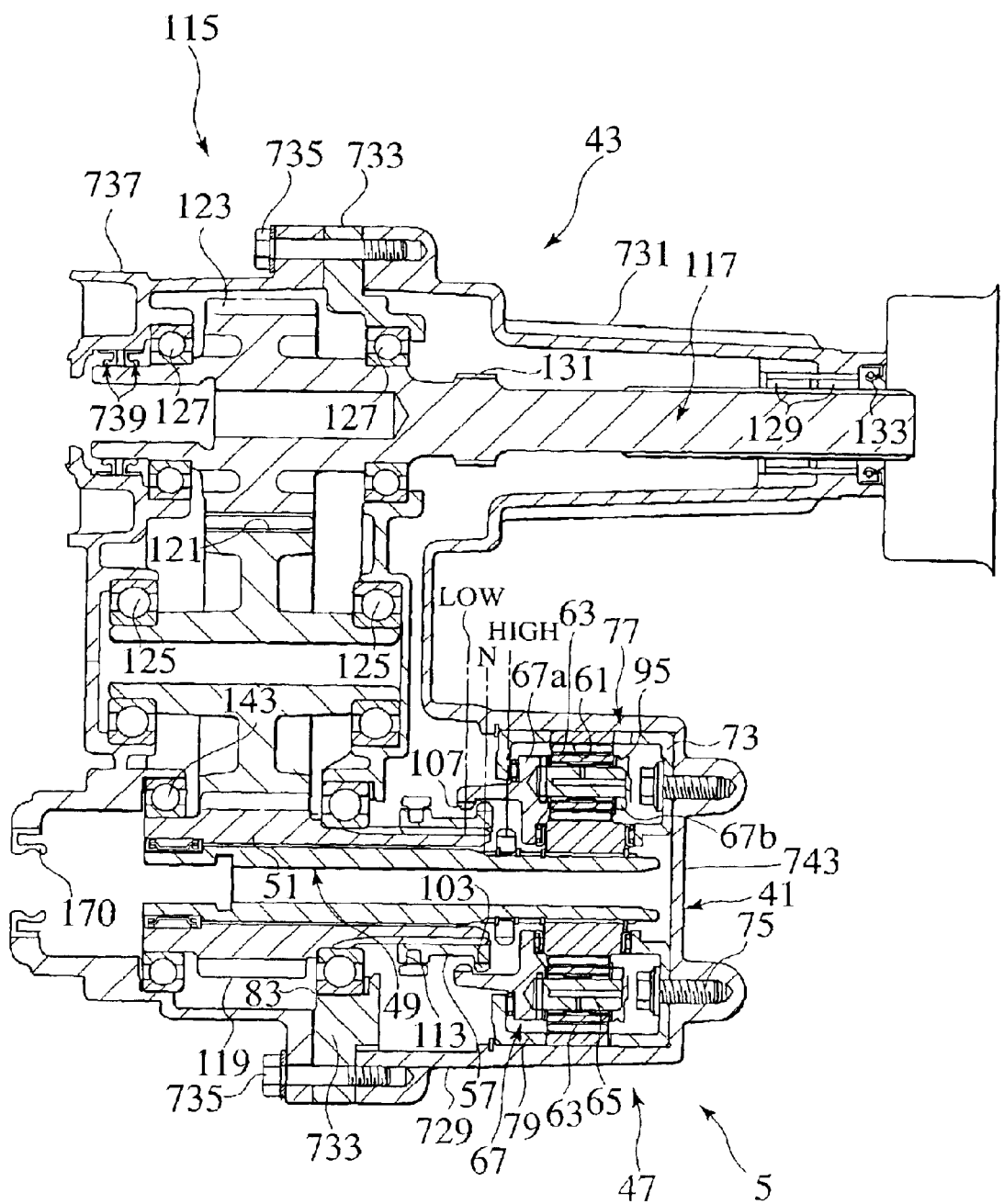
FIG. 2 is a sectional view of a rear wheel drive force output system and a sub transmission mechanism, which constitute part of the power transmission system of FIG. 1, showing a section taken along a line II-O-II in FIG. 5.
Figure 3:
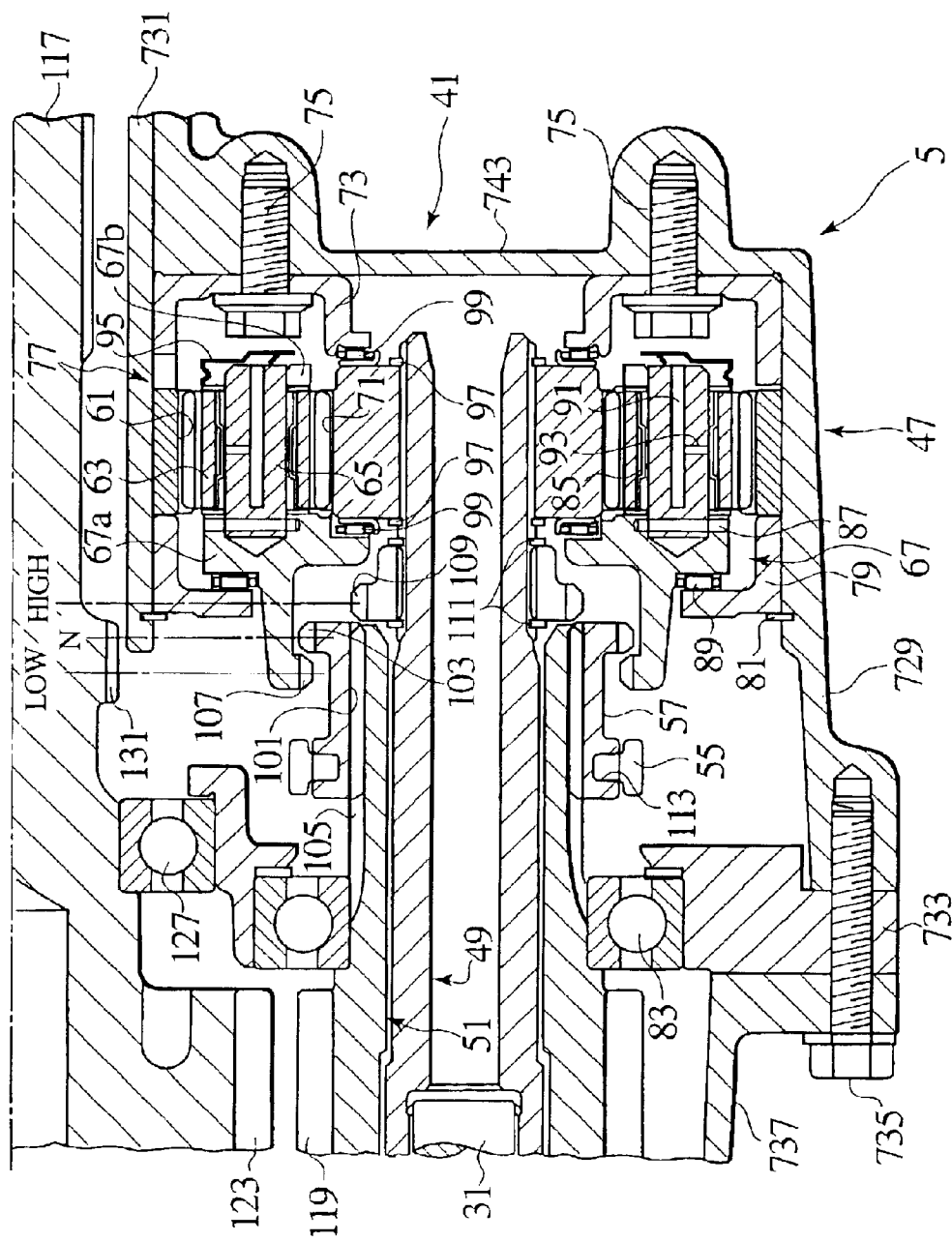
FIG. 3 is a sectional view of a main portion of the sub transmission mechanism of FIG. 2, showing a section taken along a line III—III in FIG. 5.

As shown in FIGS. 2 and 3, the planetary gear set 47 includes an internal gear 61, four pinions 63 arranged at constant intervals in a circumferential direction, a pinion carrier 67 supporting pinion shafts 65 at the front and back thereof, and a sun gear 71. The pinion shafts 65 individually support the pinions 63.

On the housing 743 of the transfer cover 729, an inner case 73 is fixed with a bolt 75. The internal gear 61 is attached to the inner case 73 and prevented from rotating by an engaging portion 77 formed between the internal gear 61 and the inner case 73. The internal gear 61 is centered on the inner circumferential surface of the housing 743 utilizing part of the housing 731 of the transfer cover 729 as a wall portion.

Furthermore, on the inner circumferential surface of the housing 743 of the transfer cover 729, another inner case 79 is attached so as to abut on the internal gear 61 and fixed with a snap ring 81, thus positioning the internal gear 61 in the axial direction.

As shown in FIG. 2, the input shaft 49 is spline-coupled to the rear end of the countershaft 31, and the output shaft 51 is coaxially arranged outside the input shaft 49 so as to be relatively rotatable. The output shaft 51 is supported on the spacer 733 by a bearing 83, and the input shaft 49 is supported on the output shaft 51 by a bearing. In such a manner, the input shaft 49 and the output shaft 51 form a double shaft structure.

Each pinion 63 is supported via a needle bearing 85 on each pinion shaft 65 supported on a front carrier plate 67a and a rear carrier plate 67b. Each shaft 65 is fixed to the front carrier plate 67a with a spring pin 87, and prevented from rotating and slipping off. Between the front carrier plate 67a and the inner case 79, a thrust bearing 89 is arranged for receiving a thrust force at the time of high-low changeover.

In each shaft 65, oil passages 91 and 93 are provided in the axial and radial directions, respectively, which communicate with each other. An oil channel 95 is attached to the rear end portion of each shaft 65.

In the oil channel 95, four oil reservoirs are formed corresponding to the rear ends of the individual shafts 65. The oil channel 95 collects transfer oil splashed by the peripheral rotary members into the oil reservoirs. The collected oil is guided through the oil passage 91 and the oil passage 93 to the needle bearing 85 for lubrication and cooling thereof.

The sun gear 71 is spline-coupled to the outer circumference of the input shaft 49 and positioned in the axial direction with the snap rings 97 and 97 at the both ends thereof, which are attached to the input shaft 49. Between the sun gear 71 and the front carrier plate 67a, and between the sun gear 71 and the inner case 73, thrust bearings 99 are arranged for receiving thrust forces at the time of high-low changeover, respectively.

On the high-low sleeve 57, an inner circumferential spline 101 and an external tooth intermediate gear 103 are formed. The high-low sleeve 57 is coupled by the spline 101 to a spline 105 formed on the circumference of the output shaft 51 so as to be movable in the axial direction. An internal tooth low gear 107 is formed on the front carrier plate 67a. The intermediate gear 103 of the high-low sleeve 57 is disengageable from the low gear 107.

An external tooth high gear 109 disengageable with the spline 101 is spline-coupled to the input shaft 49, and is positioned in the axial direction with snap rings 111 and 111 at the front and back thereof.

The tip of the shift fork 55 is slidably engaged with a circumferential groove 113 of the high-low sleeve 57. The actuator 59 operates to move the high-low sleeve 57 backward and forward via the shift rod 53 and the shift fork 55.

By this moving operation, the high-low sleeve 57 moves to a high position where the spline 101 is engaged with the high gear 109, an N position (neutral position) where the engagement of the spline 101 and the high gear 109 is released, and a low position where the intermediate gear 103 is engaged with the low gear 107 of the front carrier plate 67a.

When the high-low sleeve 57 moves to the high position, rotation (drive force from the motor 701) inputted from the countershaft 31 to the input shaft 49 is transmitted to the output shaft 51 at equal speed by bypassing the planetary gear set 47.

When the high-low sleeve 57 moves to the N position, the output shaft 51 is separated from the input shaft 49 and transmission of the drive force is cut off. In the high position and the N position, the sun gear 71, the pinions 63, and the pinion carrier 67 of the planetary gear set 47 run idle.

When the high-low sleeve 57 moves to the low position, rotation of the input shaft 49 is transmitted to the output shaft 51 via the planetary gear set 47. Specifically, rotation of the input shaft 49 is inputted from the sun gear 71 to the planetary gear set 47 to be reduced in speed, and transmitted from the front carrier plate 67a via the high-low sleeve 57 to the output shaft 51 at a low rotation speed.

The rear wheel drive force output system 43 includes a gear set 115 and a rear wheel power take-off shaft 117, as shown in FIG. 1.

The gear set 115 includes an output gear 119, an idle gear 121 engaged with the output gear 119, and an input gear 123 engaged with the idle gear 121.

As shown in FIG. 2, the output gear 119 is formed on the outer circumference of the output shaft 51, and the input gear 123 is formed on the power take-off shaft 117. Moreover, as shown in FIG. 2, the idle gear 121 is supported on the transfer case 737 and the spacer 733 by bearings 125 and 125. The front end of the power take-off shaft 117 is supported on the transfer case 737 and the spacer 733 by bearings 127 and 127, and the rear end thereof is supported on the housing 731 by bearings 129 and 129.

A pulse gear 131 for a speed meter is formed on the power take-off shaft 117. A seal 133 is arranged between the power take-off shaft 117 and the housing 731, and a seal 170 is arranged between the countershaft 31 and the transfer case 737, thus preventing oil leak.

The power take-off shaft 117 is arranged coaxially with the toroidal continuously variable transmission 3, and protruded backward from the housing 731. The rear end of the power take-off shaft 117 is spline-coupled to a flange 135 (FIG. 1), and the flange 135 is coupled to the propeller shaft 715 side.

The drive force transmitted to the output shaft 51 of the high-low changeover mechanism 41 is transmitted to the rear wheels 723 and 725 via the rear wheel drive force transmission system composed of a gear set 115, the power take-off shaft 117 (rear wheel drive force output system 43), the flange 135, and the propeller shaft 715.

Figure 4:
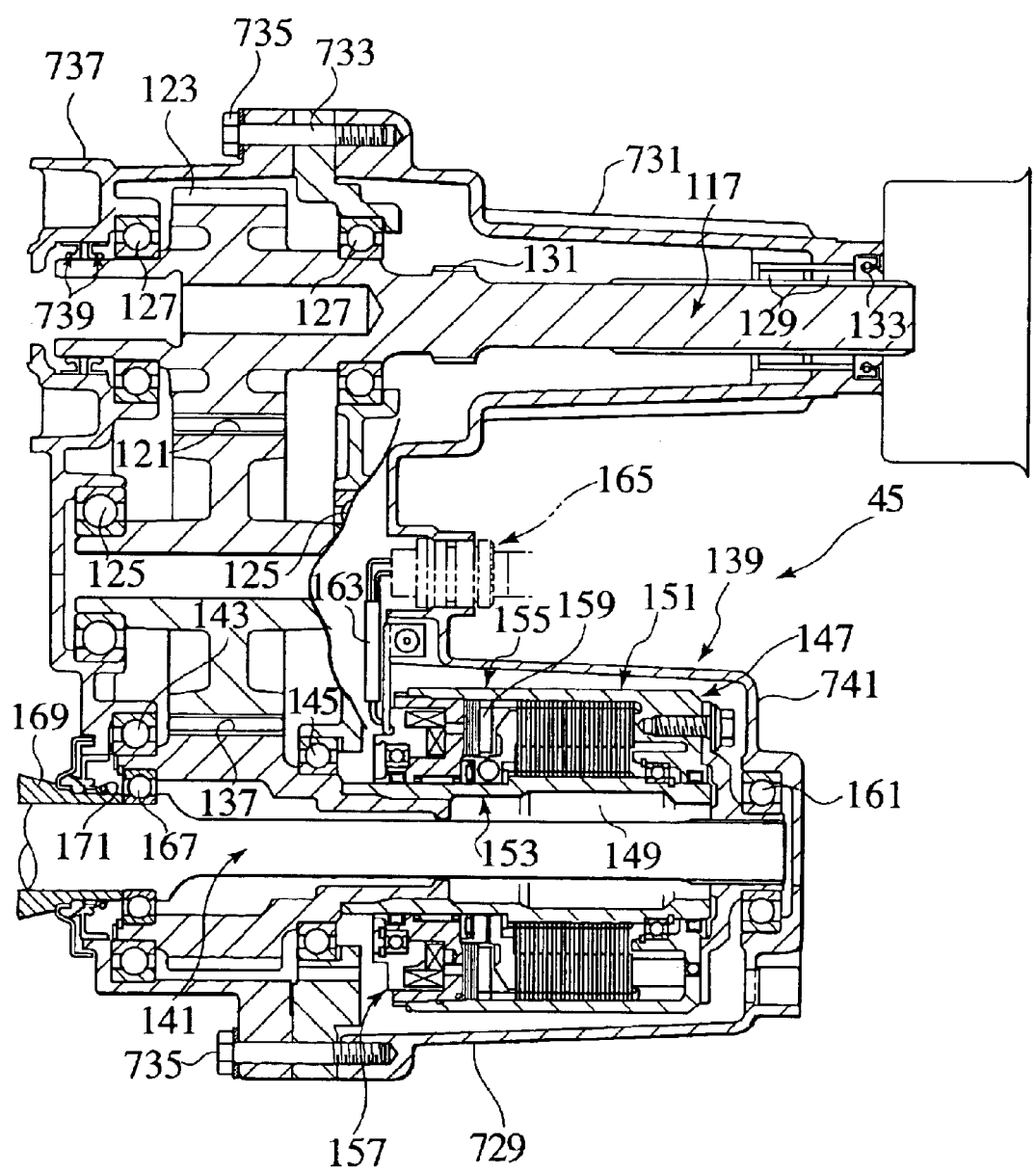
FIG. 4 is a sectional view of the rear wheel drive force output system and a front wheel drive force output system, which constitute part of the power transmission system of FIG. 1, showing a section taken along a line IV-O-IV in FIG. 5.

As shown in FIG. 4, the front wheel drive force output system 45 includes an input gear 137, an electromagnetic coupling 139, and a front wheel power take-off shaft 141.

Figure 5:
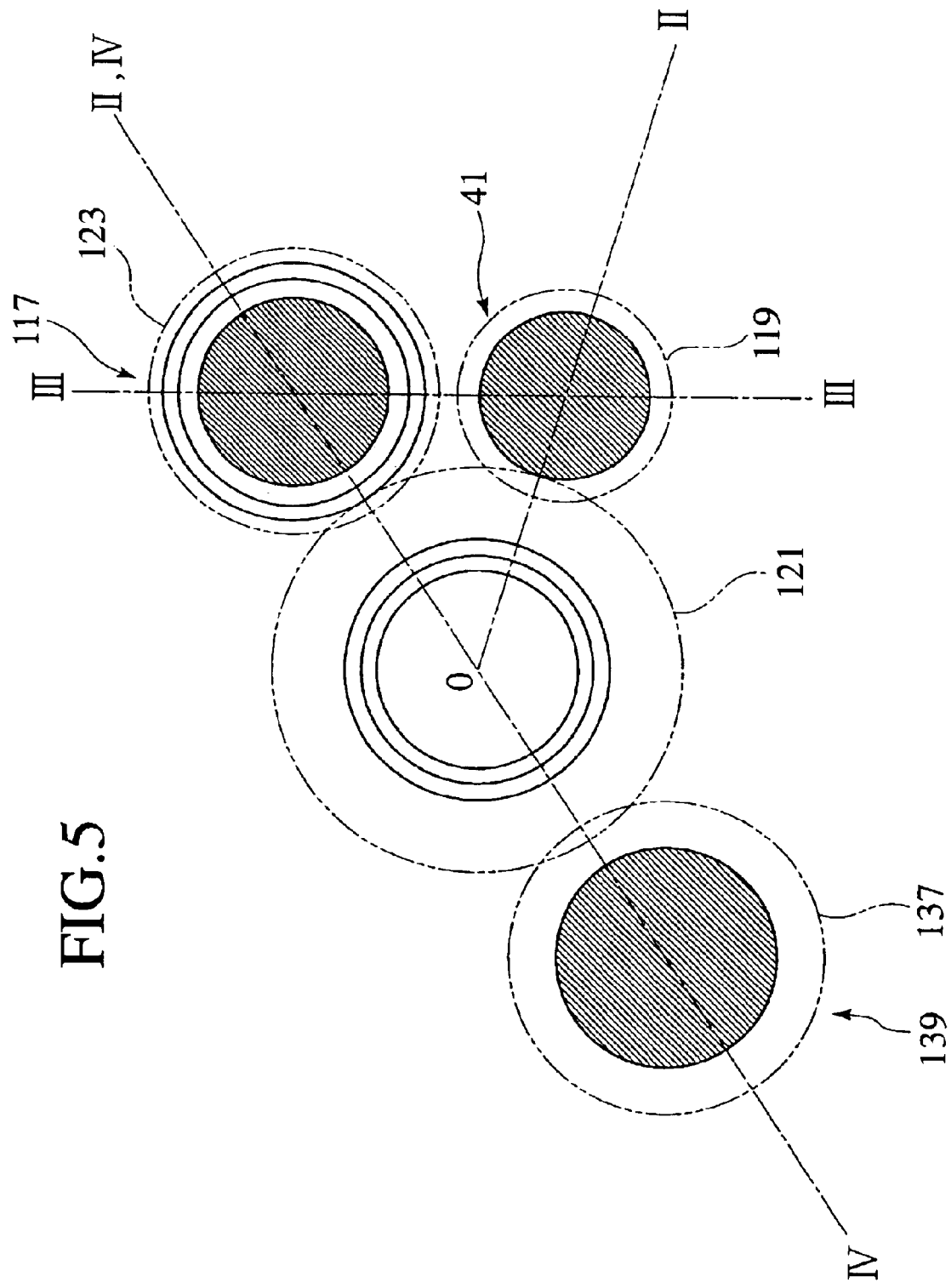
FIG. 5 is a view showing a relation of shaft arrangement of the power transmission system in FIG. 1.

The input gear 137 of the front wheel drive force output system 45 is located at an angular position (different phase position) different from the input gear 123 of the rear wheel drive force output system 43. Specifically as shown in FIG. 5, the input gear 137 is engaged with the idle gear 121 at the position opposite to the input gear 123 with respect to the idle gear 121. The input gear 137 is engaged with the idle gear 121 while overlapping the input gear 123 in axial position. The input gear 137 is supported on the transfer case 737 and the spacer 733 by bearings 143 and 145.

The electromagnetic coupling 139 is accommodated in a housing 741 formed in the transfer cover 729, which is part of the casing 727. The electromagnetic coupling 139 includes a rotary case 147, a hollow inner shaft 149, a multiple-disc main clutch 151, a ball cam 153, a multiple-disc pilot clutch 155, an electromagnet 157, an armature 159, and a controller.

The rear end of the rotary case 147 is supported on the housing 741 by a bearing 161. The front end of the inner shaft 149 is spline-coupled to the outer circumference of the input gear 137.

A lead wire 163 of the electromagnet 157 is externally drawn out through a grommet 165 attached to the housing 741 and connected to a battery on the vehicle.

The power take-off shaft 141 penetrates the inner shaft 149. The rear end portion of the power take-off shaft 141 is spline-coupled to the rotary case 147, and the front end portion thereof is supported on the input gear 137 by a bearing 167.

The power take-off shaft 141 is protruded forward from the transfer case 737, and the front end thereof is spline-coupled to a flange 169. The flange 169 is coupled to the propeller shaft 703. A seal 171 is arranged between the flange 169 and the transfer case 737 to prevent oil leak.

For setting the vehicle to a four-wheel drive mode, the controller excites the electromagnet 157. During the four-wheel drive, the controller controls an exciting current if necessary. For setting the vehicle to a two-wheel drive mode, the controller stops the excitation of the electromagnet 157.

When the electromagnet 157 is excited, the armature 159 is attracted to press and engage the pilot clutch 155. When the pilot clutch 155 is engaged, the drive force from the motor 701 is applied to the ball cam 153, and the main clutch 151 is pressed and engaged, so that the electromagnetic coupling 139 is connected.

When the electromagnetic coupling 139 is connected, the drive force outputted from the output shaft 51 of the high-low changeover mechanism 41 and inputted to the input gear 137 from the idle gear 121 is transmitted to the front wheels 711 and 713 via the front wheel drive force transmission system composed of the power take-off shaft 141, the flange 169, and the propeller shaft 703, and the vehicle comes into the four-wheel drive mode, thus improving the off-road ability and the stability of the vehicle body.

In this case, if the magnetic force of the electromagnet 157 is controlled by adjusting the exciting current, skidding occurs in the pilot clutch 155, and the thrust force in the ball cam 153 changes. Therefore, the coupling force (drive force transmitted to the front wheel side via the electromagnetic coupling 139) of the main clutch 151 can be adjusted.

By such coupling force adjustment of the electromagnetic coupling 139, the drive force distribution ratio of the front wheel to the rear wheel can be controlled. If such control is conducted for the vehicle moving in a curve, the drivability and the stability of the vehicle are improved.

When the excitation of the electromagnet 157 is stopped, the pilot clutch 155 is disengaged, and the cam thrust force in the ball cam 153 disappears. Therefore, the main clutch 151 is disengaged and connection by the electromagnetic coupling 139 is released.

When connection by the electromagnetic coupling 139 is released, the front wheel side is separated, so that the vehicle is set to the two-wheel drive mode by rear wheel drive.

If hub clutches are arranged between the front axles 707 and 709 and the front wheels 711 and 173, respectively, and coupling therebetween is released in conjunction with the electromagnetic coupling 139, the power transmission system from the electromagnetic coupling 139 to the front wheels 711 and 713 is separated from both of rotation of the motor 701 and rotation following the front wheels 711 and 713 then stopping the rotation. Therefore, noise, vibration, and abrasion are considerably reduced, and thus fuel economy of the motor 701 is improved.

Moreover, the rotation direction of the drive force from the motor 701, which rotates the input shaft 19 of the toroidal continuously variable transmission 3, is reversed by the input discs 13 and 23, the friction rollers 17 and 27, and the output discs 15 and 25, then turns to a direction of normal rotation at the gear set 27. The direction of the drive force outputted from the high-low changeover mechanism 41 is reversed again between the output gear 119 and the idle gear 121, converted into the direction of normal rotation between the idle gear 121 and the input gear 123 and between the idle gear 121 and the input gear 137, and transmitted to the front and the rear wheel sides, respectively.

Now, description will be made for an assembling order of the planetary gear set 47 of the high-low changeover mechanism 41. The planetary gear set 47 of the high-low changeover mechanism 41 is sub-assembled to the housing 743, that is, previously assembled to the housing 743 and attached to the transfer case 737 and the input shaft 49 in the following order.

(1) The inner case 73 is fixed to the housing 743 with the bolt 75, and then the internal gear 61 is engaged with the inner case 73 in the engaging portion 77.

(2) The shafts 65, the spring pins 87, the pinions 63, the oil channel 95, and the thrust bearings 99 and 99, and the sun gear 71 are assembled to the pinion carrier 67, and then these are assembled to the internal gear 61 with the pinions 63 engaged with the internal gear 61.

(3) The inner case 79 is abutted on the internal gear 61 and fixed by the snap ring 81, while the thrust bearing 89 is attached between the inner case 79 and the pinion carrier 67, thus completing subassembly of the planetary gear set 47 to the housing 743.

(4) In this state, the sun gear 71 is abutted on the snap ring 97 in the front portion while the sun gear 71 is spline-coupled to the input shaft 49, and then the housing 743 is fixed to the transfer case 737 (spacer 733) with the bolt 735. Here, the gear 107 is moved forward while the gear 107 is engaged with the gear 103.

Since the high-low changeover mechanism 41 is provided in the power transmission system 1, the transmission range thereof is widened. On selecting the high position, the on-road ability of the vehicle is improved, and on selecting the low position (high torque position), the off-road ability is improved.

If changeover between the high position and the low position is performed in accordance with the number of revolutions of the motor 701, fuel economy and silence are improved.

When the N position is selected in the high-low changeover mechanism 41, running resistance of the vehicle when being trailed is considerably reduced.

Moreover, in the vehicle equipped with a winch, selection of the N position allows use of the winch.

Since the high-low changeover mechanism 41 is arranged in the end of the countershaft 31, attachment/detachment thereof is easy. Accordingly, the high-low changeover mechanism 41 can be employed to an existing power transmission system at extremely low costs on demand.

Moreover, since the high-low changeover mechanism having the N position is provided on the wheel side with respect to the continuously variable transmission unit 7, when input from the front and rear wheels is cut off at the time of stopping the engine, the continuously variable transmission unit 7 can be prevented from shifting to the high side, thus allowing the vehicle to be trailed.

Also when the high-low changeover mechanism 41 is employed to the existing power transmission system, since interference with existing peripheral members is not likely to occur in the end of the countershaft 31, changes in layout or shape of the peripheral members are avoided or minimized, thus saving cost.

The high-low changeover mechanism 41 arranged in the end of the countershaft 31 is easy to access, thus providing high maintainability.

Since the high-low changeover mechanism 41 and the countershaft 31 are coaxially arranged, the power transmission system can be short in the axial direction and compact.

Accordingly, changes in the propeller shafts 703 and 715 and the casing 727 can be avoided, and the casing 727 can be compatible, thus saving costs.

Since the high-low changeover mechanism 41 with the planetary gear set 47 is compact in the axial direction, the power transmission system 1 become compact in the axial direction, thus enhancing the mountability thereof and the compatibility of the casing.

Since the high-low changeover mechanism 41 has a double shaft structure of the input shaft 49 and the output shaft 51, the high-low changeover mechanism 41 becomes further compact in the axial direction, thus enhancing the mountability of the power transmission system 1.

Since the high-low changeover mechanism 41 is made compact in the axial direction in such a manner, the high-low changeover mechanism 41 is suitable to arrange in the end of the countershaft 31.

Moreover, the double shaft structure allows a way of taking off torque that the input in the axial direction is outputted in the radial direction, which has not been realized in the conventional sub transmission mechanism.

Since part of the housing 731 for accommodating the rear wheel output shaft 117 is utilized as the wall portion of the housing 743 for accommodating the high-low changeover mechanism 41, a double structure in this part of the casing can be prevented.

Accordingly, the casing 727 becomes simple in structure, light in weight and low in cost.

In transmission of power to the front and rear wheels, the two input gears 123 and 137 are engaged with the one idle gear 121 at different angular positions. Moreover, the two input gears 123 and 137 are overlapped each other in axial position. Therefore, reduction in the number of parts and the length in the axial direction can be achieved.

Second Embodiment

A power transmission system 201 (a second embodiment of the present invention) includes the toroidal continuously variable transmission 3 and the power transfer system 5. The power transfer system 5 includes the high-low changeover mechanism 41, the rear wheel power output system 43, and the front wheel power output system 45. The high-low changeover mechanism 41 includes the planetary gear set 47, the input shaft 49, the output shaft 51, and the operation system having the shift rod 53, the shift fork 55, the high-low sleeve 57, and the actuator 59 (electromotive stepping motor or the like).

Next, description will be made on differences from the power transmission system 1 of the first embodiment.

Figure 6:
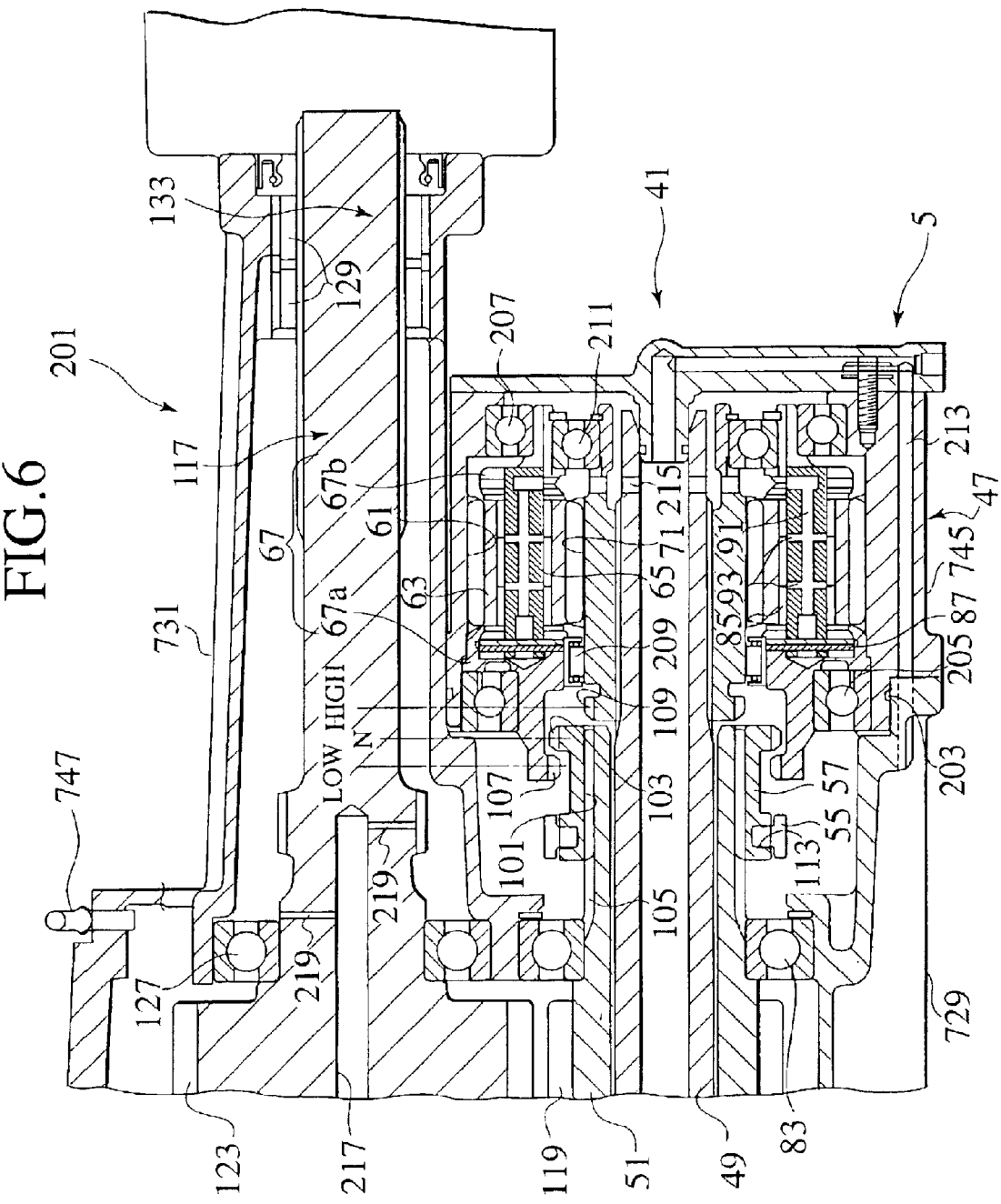
FIG. 6 is a sectional view of a main portion of a sub transmission mechanism constituting part of a power transmission system according to a second embodiment of the present invention, showing a section equivalent to that in FIG. 3.
Figure 7:
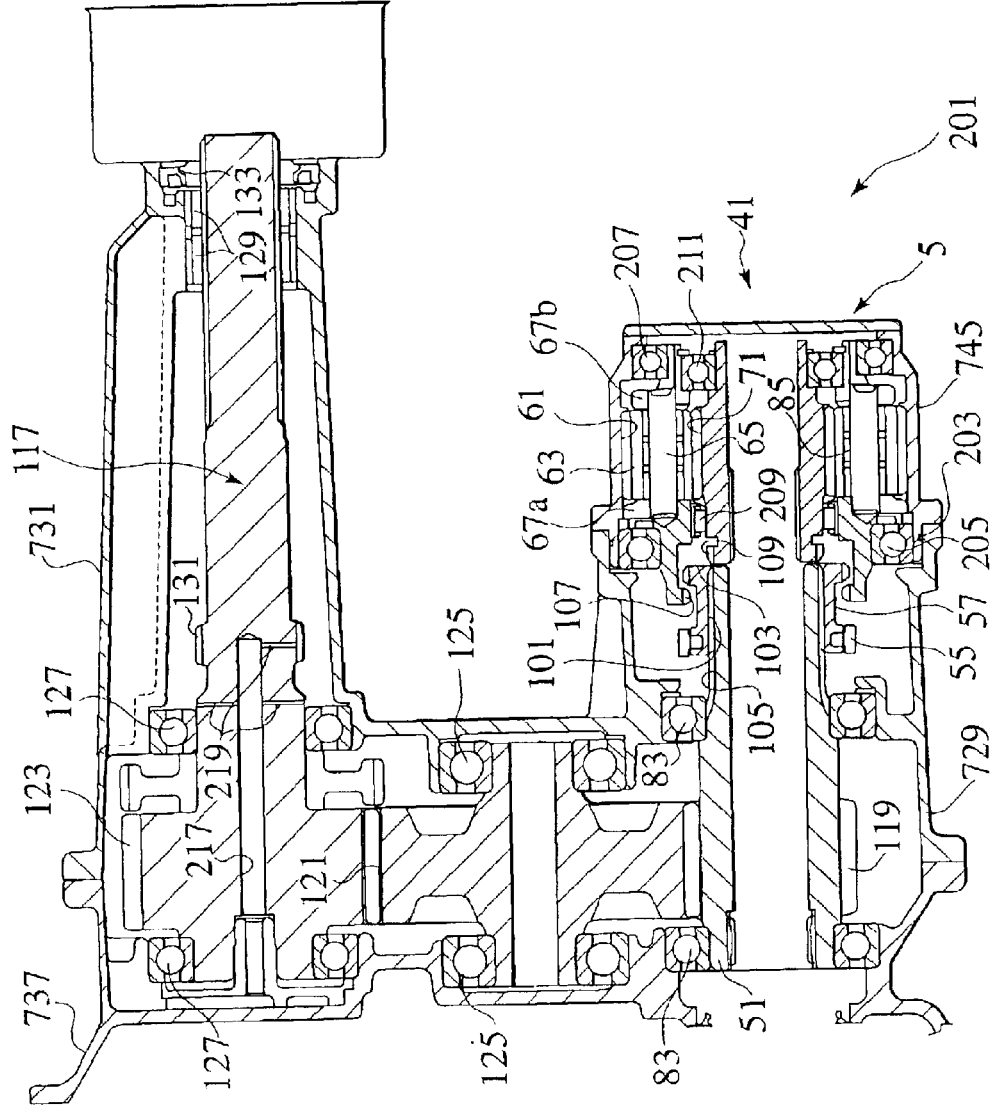
FIG. 7 is a sectional view of the sub transmission mechanism in FIG. 6, showing a section equivalent to that in FIG. 2.

As shown in FIGS. 6 and 7, the teeth of the internal gear 61 of the planetary gear set 47 are integrally formed on the inner surface of a housing 745 constituting part of a casing for accommodating the power transmission system 201. The housing 745 is fixed to the transfer cover 729 with a bolt. Between the housing 745 and the transfer cover 729, an O ring 203 is arranged to prevent oil leak.

The front carrier plate 67a and the rear carrier plate 67b are supported on the housing 745 by a bearing 205 and a bearing 207, respectively.

The sun gear 71 and the high gear 109 are integrally formed. The front end thereof is supported on the housing 745 via a needle bearing 209, the front carrier plate 67a, and the bearing 205. The rear end thereof is supported on the housing 745 via a bearing 211, the rear carrier plate 67b, and the bearing 207.

An oil passage 213 is formed through the transfer cover 729 and the housing 745, and an oil passage 215 is formed through the input shaft 49, the sun gear 71, and the rear carrier plate 67b. Therefore, pressurized oil from an oil pump is guided to the needle bearing 85 for forced lubrication.

In the rear wheel output shaft 117, oil passages 217 and 219 are formed in the axial direction and the radial direction, respectively. Pressurized oil from the oil pump and a hydraulic control system is guided to the engaging portion of the pulse gear 131 and the bearing 127 for forced lubrication.

A breather 747 is attached to the upper portion of the transfer cover 729, which keeps uniform pressure inside and outside the transfer cover 729 to prevent oil burst.

The planetary gear set 47 of the high-low changeover mechanism 41 is sub assembled to the housing 745 as follows to be attached to the transfer cover 729 and the input shaft 49.

(1) The shafts 65, the spring pins 87, the pinions 63, the bearings 207, 209, and 211, and the sun gear 71 (high gear 109) are assembled to the pinion carrier 67.
(2) In this state, the pinions 63 are engaged with the internal gear 61 and assembled to the housing 745. Subsequently, the bearing 205 is attached between the housing 745 and the front carrier plate 67a, thus completing subassembly of the planetary gear set 47 to the housing 745.
(3) While the sun gear 71 (high gear 109) is spline-coupled to the input shaft 49, the housing 745 is fixed to the transfer cover 729 with a bolt. Here, the gear 107 is moved forward while the gear 107 is engaged with the gear 103.

As described above, since the housing 745 is separated from the housing 731, the transfer cover 729 and the input shaft 49 can be attached in a state where the planetary gear set 47 is sub assembled to the housing 745.

Therefore, since the high-low changeover mechanism 41 of the power transmission system 201 is sub assembled to the housing 745, attachment/detachment thereof is easy, thus improving maintainability.

Moreover, the high-low changeover mechanism 41 can be easily added later to an existing power transmission system at low costs on demand. For example, if the input shaft 49, the planetary gear set 47 sub assembled to the housing 745, the shift rod 53, the shift fork 55, the high-low sleeve 57, and the actuator 59 are attached to an existing power transmission system where the countershaft 31 is directly coupled to the output shaft 51, a sub transmission capability like the high-low changeover mechanism 41 can be easily added.

Third Embodiment

Figure 8:
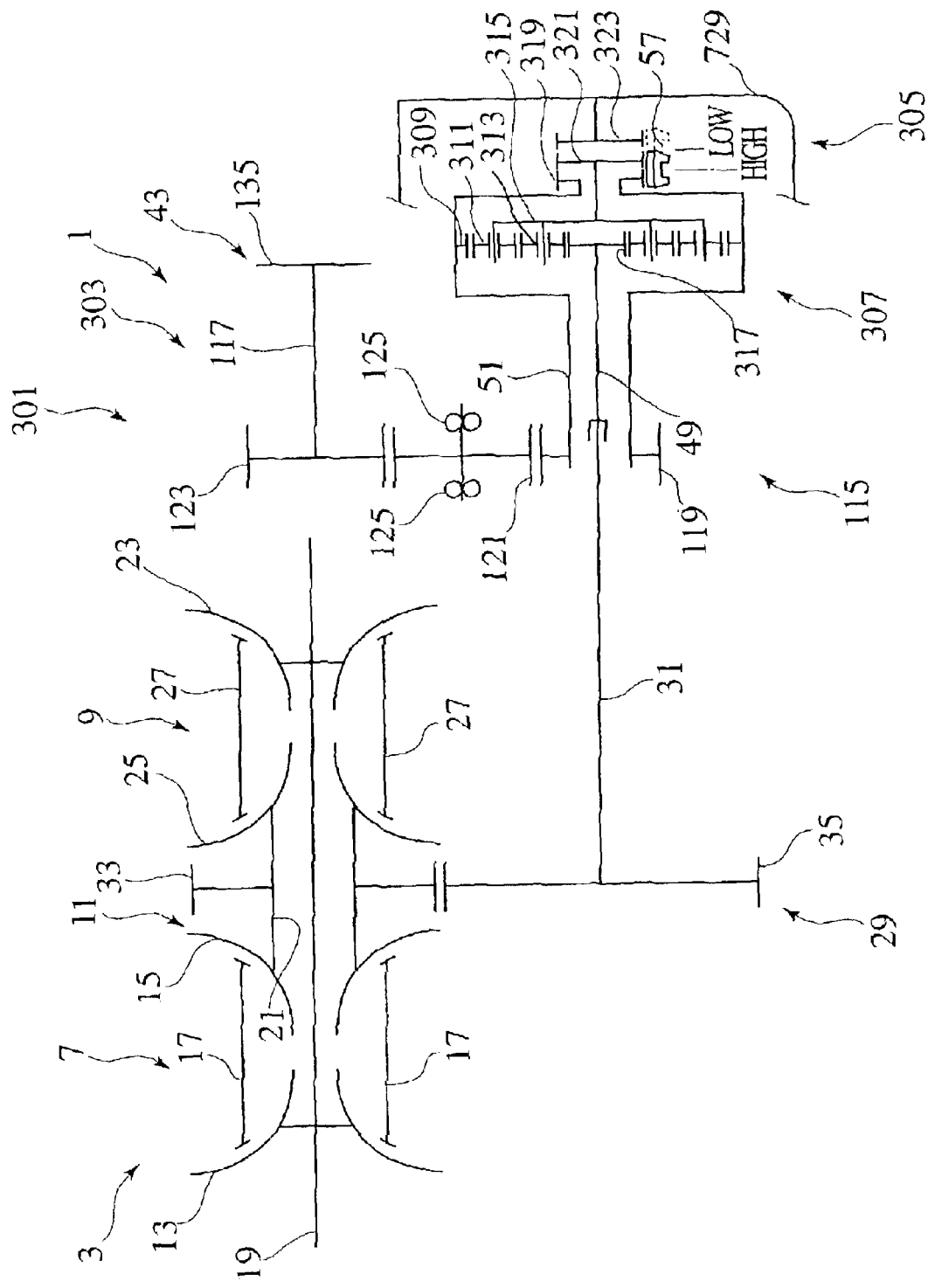
FIG. 8 is a diagram showing a power transmission system according to a third embodiment of the present invention.

As shown in FIG. 8, a power transmission system 301 (a third embodiment of the present invention) includes the toroidal continuously variable transmission 3 and a power transfer system 303. The power transfer system 303 includes a high-low changeover mechanism 305 (sub transmission mechanism), the rear wheel power output system 43, and the front wheel power output system 45 (not shown in FIG. 8) in which, as shown in FIG. 3, the input gear 137 thereof is engaged with the idle gear 121. The high-low changeover mechanism 305 includes a double pinion planetary gear set 307, the input shaft 49, the output shaft 51, and the operation system similar to that of FIG. 1, having the shift rod 53, the shift fork 55, the high-low sleeve 57, and the actuator 59 such as an electromotive stepping motor or the like (components other than the high-low sleeve 57 are not shown in FIG. 8).

Next, description will be made on differences from the power transmission system 1 of the first embodiment.

As shown in FIG. 8, the planetary gear set 307 includes an internal gear 309, outside and inside pinions 311 and 313, and a carrier 315 supporting shafts which support the pinions 311 and 313, and a sun gear 317.

The internal gear 309 is coupled to the output shaft 51, and the sun gear 317 is coupled to the input shaft 49.

An external tooth high gear 319 is coupled to the internal gear 309, an external tooth intermediate gear 321 is coupled to the carrier 315, and an external tooth low gear 323 arranged coaxially with the input shaft 49 is coupled to the transfer cover 729. The high gear 319, the intermediate gear 321, and the low gear 323 are arranged to be adjacent to each other.

The high-low sleeve 57 having internal teeth for engaging with the high gear 319, the intermediate gear 321, and the low gear 323 is operated to move forward and backward by the actuator 59 via the shift rod 53 and the shift fork 55. Therefore, the high-low sleeve 57 moves to the high position, where the high-low sleeve 57 is engaged with the high gear 319 and the intermediate gear 321 to couple the gears 319 and 321, and to the low position, where the high-low sleeve 57 is engaged with the intermediate gear 321 and the low gear 323 to couple the gears 321 and 323.

At the high position, coupling of the high gear 319 and the intermediate gear 321 locks differential rotation of the planetary gear set 307, and rotation (drive force from the motor 701) inputted from the countershaft 31 to the input shaft 49 is transmitted to the output shaft 51 through the locked planetary gear set 307 at equal speed.

At the low position, lock of differential rotation of the planetary gear set 307 is released, and the intermediate gear 321 is connected to the transfer cover 729 via the low gear 323 to stop. Accordingly, rotation of the input shaft 49 is inputted from the sun gear 71 to the planetary gear set 307, reversed twice between the pinions 311 and 313 to return to the normal rotation and reduce in speed to a low rotation speed, and then transmitted to the output shaft 51.

The drive force from the motor 701 inputted from the countershaft 31 in the direction of normal rotation is outputted from the high-low changeover mechanism 305. The direction of the drive force is reversed between the output gear 119 and the idle gear 121, converted again into the direction of normal rotation between the idle gear 121 and the input gear 123 and between the idle gear 121 and the gear 137, and then transmitted to the rear and front wheels, respectively.

In the power transmission system 301, in addition to the effects equivalent to the power transmission system 1 of the first embodiment, since the double pinion planetary gear set 307 is used for the high-low changeover mechanism 305, the input shaft 49 (input rotation) and the output shaft 51 (output rotation) can rotate in the same direction.

Fourth Embodiment

Figure 9:
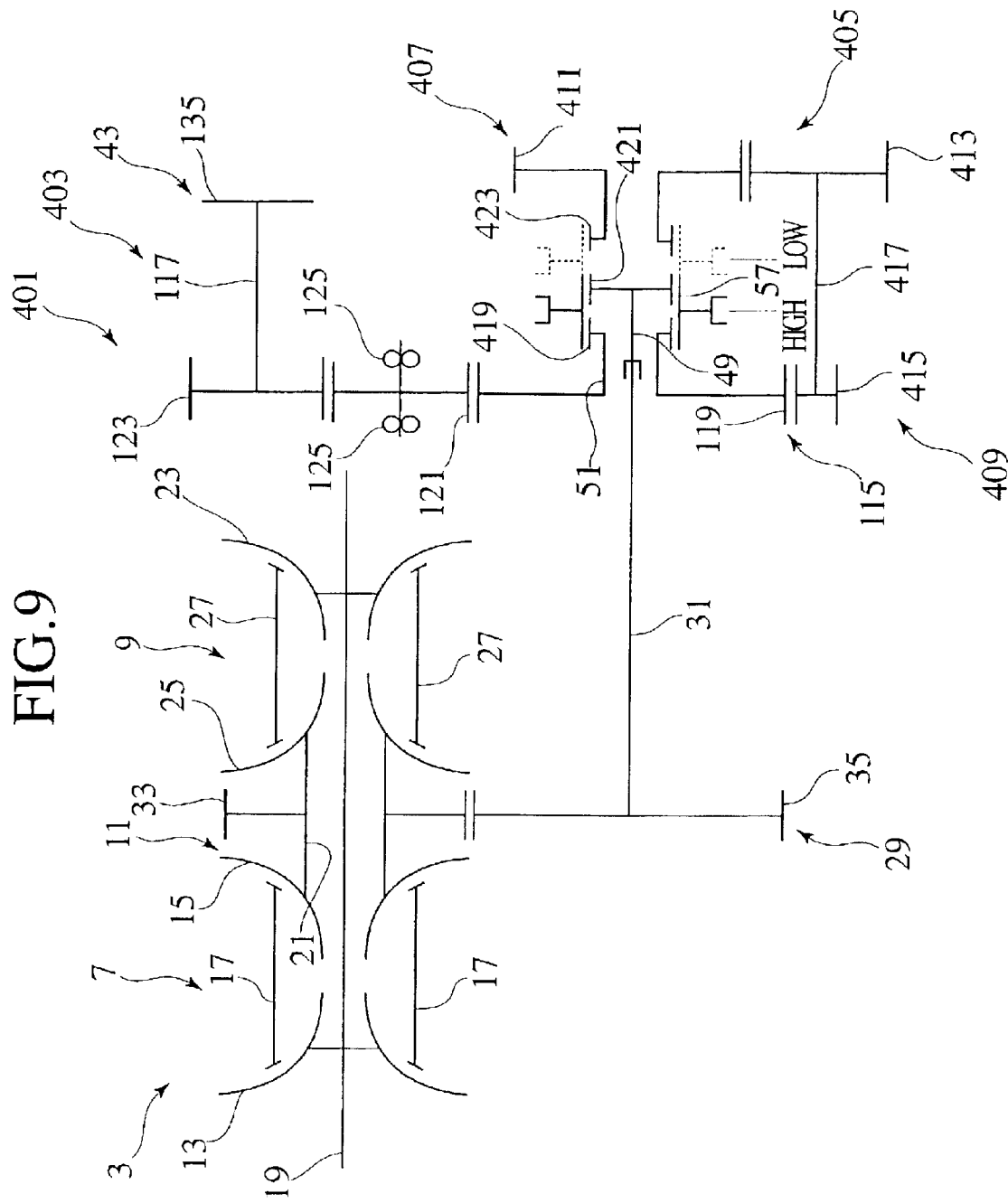
FIG. 9 is a diagram showing a power transmission system according to a fourth embodiment of the present invention.

As shown in FIG. 9, a power transmission system 401 (a fourth embodiment of the present invention) includes the toroidal continuously variable transmission 3 and a power transfer system 403. The power transfer system 403 includes a high-low changeover mechanism 405 (sub transmission mechanism), the rear wheel power output system 43, and the front wheel power output system 45 (not shown in FIG. 9) in which, as shown in FIG. 3, the input gear 137 thereof is engaged with the idle gear 121. The high-low changeover mechanism 405 includes reduction gear sets 407 and 409, the input shaft 49, the output shaft 51, and the operation system similar to that of FIG. 1, having the shift rod 53, the shift fork 55, the high-low sleeve 57, and the actuator 59 such as an electromotive stepping motor or the like (components other than the high-low sleeve 57 are not shown in FIG. 9).

Next, description will be made on differences from the power transmission system 1 of the first embodiment.

As shown in FIG. 9, the reduction gear set 407 includes a gear 411 and a gear 413, and the reduction gear set 409 includes a gear 415 and the output gear 119. The gear 413 is larger than the gear 411 in diameter, and the output gear 119 is larger than the gear 415 in diameter. The gears 413 and 415 are integrally formed on a parallel shaft 417 parallel to the input shaft 49.

An external tooth high gear 419 is formed on the output shaft 51, an external tooth intermediate gear 421 is formed on the input shaft 49, and an external tooth low gear 423 is integrally formed on a gear 411 arranged coaxially with the input shaft 49. The high gear 419, the intermediate gear 421, and the low gear 423 are arranged to be adjacent to each other.

The high-low sleeve 57 having internal teeth for engaging with the high gear 419, the intermediate gear 421, and the low gear 423 is operated to move forward and backward by the actuator 59 via the shift rod 53 and the shift fork 55. Therefore, the high-low sleeve 57 moves to the high position, where the high-low sleeve 57 couples the high gear 419 and the intermediate gear 421, or to the low position, where the high-low sleeve 57 couples the intermediate gear 421 and the low gear 423.

At the high position, the input shaft 49 and the reduction gear set 407 are separated from each other, and rotation (drive force from the motor 701) inputted from the countershaft 31 to the input shaft 49 is transmitted via the intermediate gear 421 and the high gear 419 to the output shaft 51 at the equal speed.

At the low position, rotation of the input shaft 49 is reduced and reversed twice by the reduction gear sets 407 and 409 on the parallel shaft 417 to return to normal rotation, and then transmitted to the output shaft 51 at a low rotation speed.

In the power transmission system 401 has the effects equivalent to the power transmission system 1 of the first embodiment.

Fifth Embodiment

Figure 10:
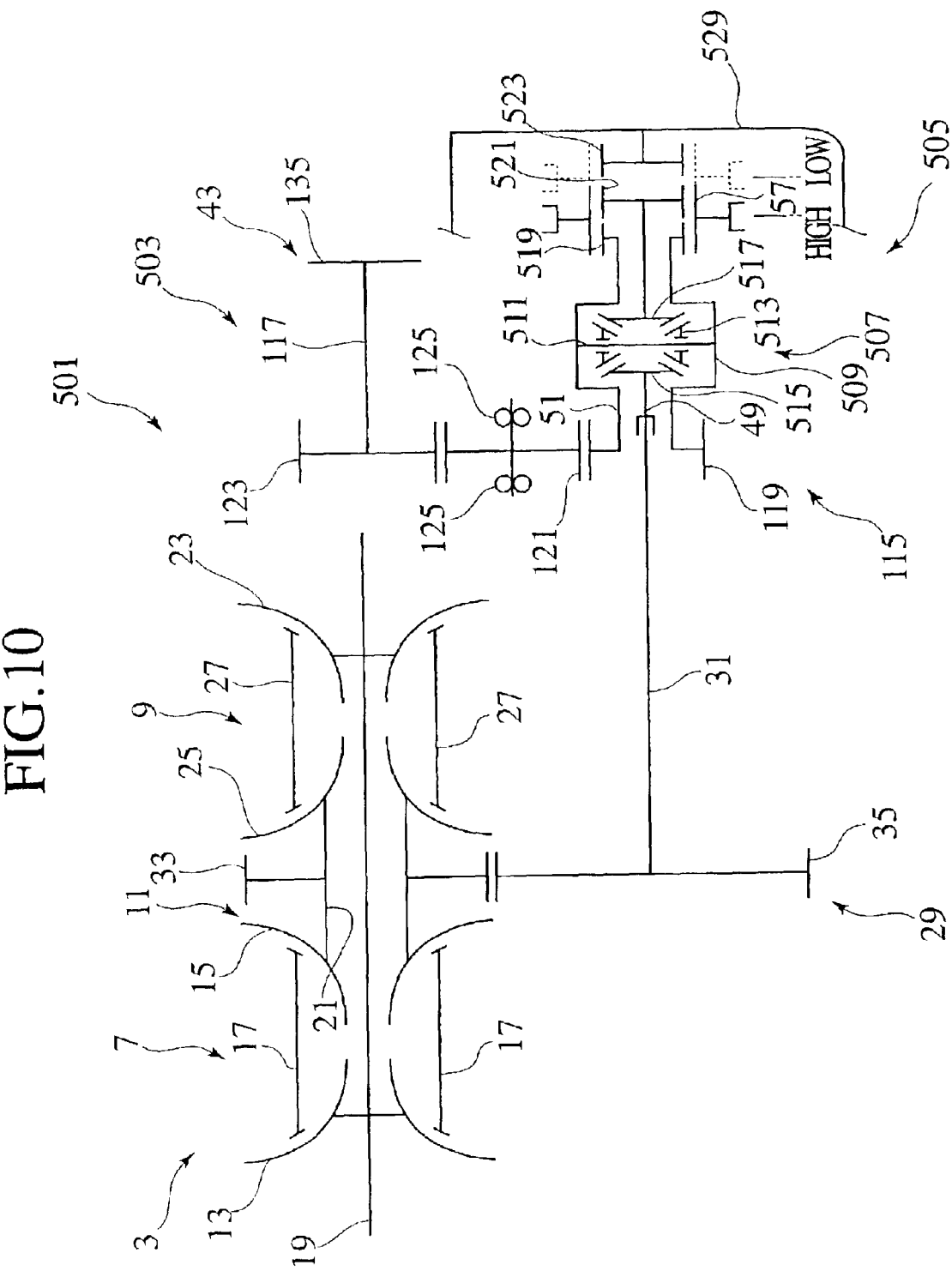
FIG. 10 is a diagram showing a power transmission system according to a fifth embodiment of the present invention.

As shown in FIG. 10, a power transmission system 501 (a fifth embodiment of the present invention) includes the toroidal continuously variable transmission 3 and a power transfer system 503. The power transfer system 503 includes a high-low changeover mechanism 505 (sub transmission mechanism), the rear wheel power output system 43, and the front wheel power output system 45 (not shown in FIG. 10) in which, as shown in FIG. 3, the input gear 137 thereof is engaged with the idle gear 121. The high-low changeover mechanism 505 includes a bevel gear type differential mechanism 507, the input shaft 49, the output shaft 51, and the operation system similar to that of FIG. 1, having the shift rod 53, the shift fork 55, the high-low sleeve 57, and the actuator 59 such as an electromotive stepping motor or the like (components other than the high-low sleeve 57 are not shown in FIG. 10).

Next, description will be made on differences from the power transmission system 1 of the first embodiment.

As shown in FIG. 10, the bevel gear type differential mechanism 507 includes a rotary case 509, a pinion shaft 511 fixed to the rotary case 509, pinion gears 513 supported on the pinion shaft 511, front and rear side gears 515 and 517 engaged with the pinion gears 513.

The rotary case 509 is coupled to the output shaft 51, and the front side gear 515 is coupled to the input shaft 49.

An external tooth high gear 519 is coupled to the rotary case 509, an external tooth intermediate gear 521 is coupled to the rear side gear 517, and an external tooth low gear 523 arranged coaxially with the input shaft is coupled to the transfer cover 529. The high gear 519, the intermediate gear 521, and the low gear 523 are arranged to be adjacent to each other.

The high-low sleeve 57 having internal teeth for engaging with the high gear 519, the intermediate gear 521, and the low gear 523 is operated to move forward and backward by the actuator 59 via the shift rod 53 and the shift fork 55. Therefore, the high-low sleeve 57 moves to the high position, where the high-low sleeve 57 couples the high gear 519 and the intermediate gear 521, and to the low position, where the high-low sleeve 57 couples the intermediate gear 521 and the low gear 523.

At the high position, coupling of the high gear 519 and the intermediate gear 521 locks differential rotation of the front and rear side gears 515 and 517 of the differential mechanism 507. Rotation (drive force from the motor 701) inputted from the countershaft 31 to the input shaft 49 is transmitted to the output shaft 51 through the locked differential mechanism 507 at equal speed.

At the low position, lock of the differential rotation of the front and rear side gears 515 and 517 of the differential mechanism 507 is released, and the intermediate gear 521 is connected to the transfer cover 729 via the low gear 523 to stop. Therefore, rotation of the input shaft 49 is inputted from the front side gear 515 to the differential mechanism 507, and reduced via the pinion gears 513, pinion shaft 511, and the rotary case 509 to be transmitted to the output shaft 51 at a low rotation speed.

In the power transmission system 501 has the effects equivalent to the power transmission system 1 of the first embodiment.

In the fourth and fifth embodiments, the housing for accommodating the rear wheel output shaft 117 may be designed to be a wall portion of the cover member for accommodating the high-low changeover mechanism 405, 505. Accordingly, the casing is prevented from having a double structure in this portion, thus obtaining the similar effects to the power transmission system 1 of the first embodiment.

In the third, fourth, and fifth embodiments, the cover member (transfer cover 729 in the third embodiment) for accommodating the high-low changeover mechanisms 305, 405, 505 and the housing for accommodating the wheel output shaft may be separated from each other. Accordingly, the planetary gear set 307 or the high-low changeover mechanisms 405, 505 can be sub assembled to the cover member, thus obtaining the similar effects to the power transmission system 201 of the second embodiment.

The invention may be practiced or embodied in still other ways without departing from the spirit or essential character thereof. For instance, the motor in the present invention can be a power source such as an internal combustion engine or an electric motor converting electric energy into torque. The power transmission system of the present invention can be arranged in any directions, including a transverse direction.

The preferred embodiments described herein are therefore illustrative and not restrictive, the scope of the invention being indicated by the claims and all variations which come within the meaning of claims are intended to be embraced therein.

The present disclosure relates to subject matter contained in Japanese Patent Application No. 2001-327834, filed on Oct. 25, 2001, the disclosure of which is expressly incorporated herein by reference in its entirety.

What is claimed is:

1. A power transmission system comprising:
a transmission device including an input shaft to which a drive force from a motor is inputted, a transmission mechanism arranged coaxially with the input shaft, and a countershaft parallel to the input shaft; and
a power transfer system for distributing the drive force transmitted to the countershaft to front and rear wheels, wherein the power transfer system includes a sub-transmission mechanism coaxially arranged in an end of the countershaft, said sub-transmission mechanism comprising a planetary gear type high-low changeover mechanism.

2. The power transmission system according to claim 1, wherein the sub-transmission mechanism includes a neutral position for cutting off transmission of the drive force.

3. The power transmission system according to claim 1, wherein
the high-low changeover mechanism comprises a double pinion planetary gear type high-low changeover mechanism, in which an internal gear and a sun gear are connected by a pair of pinions engaged with each other.

4. The power transmission system according to claim 1, wherein
the sub-transmission mechanism has a double shaft structure including an input shaft coupled to the countershaft and an output shaft coaxially arranged outside the input shaft.

5. The power transmission system according to claim 1, wherein
the sub-transmission mechanism is sub assembled to a cover member constituting part of a casing for accommodating the power transmission system.

6. The power transmission system according to claim 1, wherein
a housing portion for any one of a front side output shaft and a rear side output shaft in a casing for accommodating the power transmission system forms a wall portion of a housing portion for accommodating the sub-transmission mechanism.

7. The power transmission system according to claim 6, wherein a coupling mechanism for transmitting the drive force to the front side output shaft is accommodated in a cover member which accommodates the sub-transmission mechanism.

8. The power transmission system according to claim 1, wherein the sub transmission mechanism includes:
an input shaft coupled to the countershaft;
a planetary gear set including a sun gear coupled to the input shaft, inside pinions arranged around the sun gear and engaged therewith, outside pinions arranged around the inside pinions and engaged therewith, an internal gear arranged around the outside pinions and engaged therewith, having an external tooth first engaging portion, and a pinion carrier for supporting the inside and outside pinions, provided with an external tooth second engaging portion;
a sleeve having an internal tooth fourth engaging portion to be engaged with the first engaging portion of the internal gear, the second engaging portion of the pinion carrier, and an external tooth third engaging portion fixed to a casing for accommodating the power transmission system; and
an output shaft coupled to the internal gear and coaxially arranged outside the input shaft to be relatively rotatable,
wherein the sleeve, is operable to move to;
a first position, where the fourth engaging portion of the sleeve is engaged with the first engaging portion of the internal gear and the second engaging portion of the pinion carrier to couple the first and the second engaging portions and rotation of the countershaft is transmitted to the output shaft at equal speed; and a second position, where the fourth engaging portion of the sleeve is engaged with the second engaging portion of the pinion carrier and the third engaging portion to couple the first and the third engaging portions and rotation of the countershaft is reduced in speed and transmitted via the planetary gear set to the output shaft.

9. The power transmission system according to claim 1, wherein the sub transmission mechanism includes:

an input shaft coupled to the countershaft and provided with an external tooth first engaging portion;

a first gear arranged coaxially with the input shaft, having an external tooth second engaging portion integrally formed thereon to be adjacent to the first engaging portion;

an output shaft coaxially arranged outside the input shaft to be relatively rotatable, having a second gear larger than the first gear in diameter and an external tooth third engaging portion adjacent to the first engaging portion;

a parallel shaft parallel to the input shaft, with a pair of gears integrally formed and engaged with the first and second gears, respectively; and a sleeve having an internal tooth fourth engaging portion to be engaged with the first engaging portion of the input shaft, the second engaging portion of the first gear, and the third engaging portion of the output shaft, and wherein the sleeve is operable to move to;

a first position, where the fourth engaging portion of the sleeve is engaged with the first engaging portion of the input shaft and the third engaging portion of the output shaft to couple the first and the third engaging portions, and rotation of the countershaft is transmitted to the output shaft at equal speed; and a second position, where the fourth engaging portion of the sleeve is engaged with the first engaging portion of the input shaft and the second engaging portion of the first gear to couple the first and the second engaging portions, and rotation of the countershaft is reduced in speed via the first and second gears and the parallel shaft and transmitted to the output shaft.

10. The power transmission system according to claim 1, wherein the sub transmission mechanism includes:

an input shaft coupled to the countershaft;

a bevel gear type differential mechanism including a pair of side gears, one of which is coupled to the input shaft and the other has an external tooth first engaging portion, a pinion gear engaged with the side gears, a pinion shaft supporting the pinion gear, and a rotary case coupled to the pinion shaft, having an external tooth second engaging portion adjacent to the first engaging portion;

an output shaft coaxially arranged outside the input shaft to be relatively rotatable and coupled to the rotary case of the bevel gear type differential mechanism; and a sleeve having an internal tooth fourth engaging portion to be engaged with the first engaging portion of the side gear, the second engaging portion of the rotary case of the bevel gear type differential mechanism, and an external tooth third engaging portion fixed to a casing for accommodating the power transmission system, and wherein the sleeve is operable to move to;

a first position, where the fourth engaging portion of the sleeve is engaged with the first engaging portion and the second engaging portion of the bevel gear type differential mechanism to couple the first and the second engaging portions, and rotation of the countershaft is transmitted to the output shaft at equal speed; and a second position, where the fourth engaging portion of the sleeve is engaged with the first engaging portion of the bevel gear type differential mechanism and the fixed third engaging portion to couple the first and the third engaging portions, and rotation of the countershaft is reduced in speed via the bevel gear type differential mechanism and transmitted to the output shaft.

11. A power transmission system comprising:

a transmission device including an input shaft to which a drive force from a motor is inputted, a transmission mechanism arranged coaxially with the input shaft, and a countershaft parallel to the input shaft; and a power transfer system for distributing the drive force transmitted to the countershaft to front and rear wheels, the power transfer system including a sub-transmission mechanism coaxially arranged in an end of the countershaft, wherein the sub-transmission mechanism includes:

an input shaft coupled to the countershaft and provided with an external tooth first engaging portion;

a planetary gear set including a sun gear coupled to the input shaft, pinions arranged around the sun gear and engaged therewith, a stationary internal gear arranged around the pinions and engaged therewith, and a pinion carrier for supporting the pinions, provided with an internal tooth second engaging portion;

a sleeve having an internal tooth third engaging portion to be engaged with the first engaging portion of the input shaft, and an external tooth fourth engaging portion to be engaged with the second engaging portion of the pinion carrier of the planetary gear set; and an output shaft supporting the sleeve to be movable in an axial direction, the output shaft coaxially arranged outside the input shaft to be relatively rotatable, and wherein the sleeve is operable to move to:

a first position, where the third engaging portion of the sleeve is engaged with the first engaging portion of the input shaft and rotation of the countershaft is transmitted to the output shaft at equal speed;

a second position, where the fourth engaging portion of the sleeve is engaged with the second engaging portion of the pinion carrier of the planetary gear set and the rotation of the countershaft is reduced in speed via the planetary gear set and transmitted to the output shaft; and a third position between the first and second positions, where engagement between the third engaging portion of the sleeve and the first engaging portion of the input shaft and engagement between the fourth engaging portion of the sleeve and the second engaging portion of the pinion carrier of the planetary gear set are released, and transmission of the drive force to the output shaft is cut off.

12. The power transmission system, according to claim 11, wherein the teeth of the internal gear of the planetary gear set is integrally formed on an inner surface of a detachable housing portion constituting part of a casing for accommodating the power transmission system.

13. The power transmission system according to claim 11, wherein the power transfer system further including:

a rear wheel drive force output system having an output gear formed on the output shaft of the sub-transmission mechanism, an idle gear engaged with the output gear, and a power take off shaft having an input gear engaged with the idle gear; and a front wheel drive force output system including an input gear engaged with the idle gear of the rear wheel drive force output system, an electromagnetic coupling having an inner shaft coupled to the input gear, and a power take off shaft to which the driving force from the motor is transmitted via the electromagnetic coupling, and wherein the input gear of the front wheel drive force output system is engaged with the idle gear at a position opposite to the input gear of the rear wheel drive force output system with respect to the idle gear.

* * * * *